United States Patent
Subramanian et al.

(10) Patent No.: US 7,139,942 B2
(45) Date of Patent: Nov. 21, 2006

(54) METHOD AND APPARATUS FOR MEMORY REDUNDANCY AND RECOVERY FROM UNCORRECTABLE ERRORS

(75) Inventors: Srinivasan Subramanian, Palo Alto, CA (US); John G. Johnson, San Jose, CA (US); Gregory C. Onufer, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 345 days.

(21) Appl. No.: 10/624,829

(22) Filed: Jul. 21, 2003

(65) Prior Publication Data

US 2005/0022078 A1    Jan. 27, 2005

(51) Int. Cl.
G11C 29/00 (2006.01)
G06F 11/00 (2006.01)
(52) U.S. Cl. .......................... 714/710; 714/41
(58) Field of Classification Search ............... 714/710, 714/704, 6, 42, 41, 753, 752
See application file for complete search history.

(56) References Cited

U.S. PATENT DOCUMENTS 6,941,505 B1 *  9/2005  Yada et al. ................. 714/763

2002/0042893 A1   4/2002  Larson et al. .................. 714/7
2002/0069334 A1 * 6/2002  Hsia et al. ................... 711/147
2002/0069337 A1 * 6/2002  Hsia et al. ................... 711/168

FOREIGN PATENT DOCUMENTS

GB        1 512 220        10/1975

OTHER PUBLICATIONS

Satya et al., "Electronic Reorganization of Memory for Handling Uncorrectable Memory Errors", *IBM Technical Disclosure Bulletin*, vol. 22, No. 12, pp. 5378-5381, May 1980.

* cited by examiner

*Primary Examiner*—Phung My Chung
(74) *Attorney, Agent, or Firm*—Gunnison, McKay & Hodgson, L.L.P.; Forrest Gunnison

(57) ABSTRACT

A system maintains a copy of data stored in a first memory device in a redundant distinct second memory device. Upon detecting an uncorrectable error in the first memory device, the system then relies on the copy of the data in the second memory device. The system, once it starts relying on the data in the second memory device, may then test the first memory device to determine if the uncorrectable error was due to a physical problem or a transient event. If the first memory device is then found to be working correctly, it may, in turn, become a redundant memory device for the second memory device.

7 Claims, 3 Drawing Sheets

METHOD AND APPARATUS FOR MEMORY REDUNDANCY AND RECOVERY FROM UNCORRECTABLE ERRORS

FIELD OF THE INVENTION

The present invention relates to the field of memory redundancy. More particularly, the present invention relates to maintaining a redundant backup memory system and switching from a primary memory system to the redundant backup memory system upon the occurrence of a fault.

BACKGROUND OF THE INVENTION

Typically, systems that make use of electronic data and commands store the data and commands in some sort of memory device. Access to the data stored in the memory device is often controlled by a memory control unit (MCU). In such a system, each individual memory device is assigned to an MCU, and each MCU controls access to its corresponding memory devices. For example, in a computer, when a microprocessor requests data from the computer's Random Access Memory (RAM), the microprocessor sends a request to the MCU corresponding to the RAM, and the MCU fetches the requested data from the RAM and sends it to the microprocessor.

The MCU also controls the writing of data to the memory devices assigned to it. For the system to run reliably, the data written to the memory device and stored in the memory device must be identical to the data received by the MCU. In order to ensure the accuracy of the data written and stored in the memory device, the MCU may use an Error Correcting Circuit (ECC) to verify the receipt, writing and storage of the incoming data.

ECC's may detect single- and multi-bit errors in a data stream. Single-bit errors are most often caused by a random transient event. ECC's also have the ability to correct most single-bit errors, allowing the system to operate without downtime attributable to correctable single-bit errors. However, there are certain types of single-bit errors that are uncorrectable. These uncorrectable single-bit errors are sometimes referred to as "sticky bits." A "sticky bit" usually is the result of a physical problem in the memory device. A "sticky bit" does not always change state when requested. In addition, there are multi-bit errors that are typically uncorrectable. The multi-bit errors may be the result of a physical problem in the memory device, like a "sticky bit," or they may be the result of some other random transient event.

Unlike correctable single-bit errors, multi-bit errors and uncorrectable single-bit errors will result in a difference between the data received and the data actually written to the memory device. Upon receipt and identification of an uncorrectable error, most systems will shut down to avoid further corruption of the data or operating with corrupted data. For example, in a computer system, receipt and identification of an uncorrectable error will often cause the initiation of a controlled shutdown, including a recordation of the error. In contrast, operating the system with corrupted data may lead to an uncontrolled shutdown, or "crash." In any case, uncorrectable errors result in shutdowns that reduce the uptime and availability of the system.

To improve the reliability and availability of such a system, what is needed is a solution that may, upon identification of an uncorrectable error, switch to a redundant backup memory system so that the system may continue operating without downtime. In addition, what is needed is a solution that is able to test the memory device to determine if the uncorrectable error is due to a physical problem with the memory device, or due to a random transient event.

BRIEF DESCRIPTION

In a first aspect of the invention, a system such as a computer system maintains a copy of data stored in a first memory device in a redundant distinct second memory device. Upon detecting an uncorrectable error in the first memory device the system then relies on the copy of the data in the second memory device. In a second aspect of the invention, the system, once it starts relying on the data in the second memory device, may then test the first memory device to determine if the uncorrectable error was due to a physical problem or a transient event. If the first memory device is then found to be working correctly, it may, in turn, become a redundant memory device for the second memory device.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
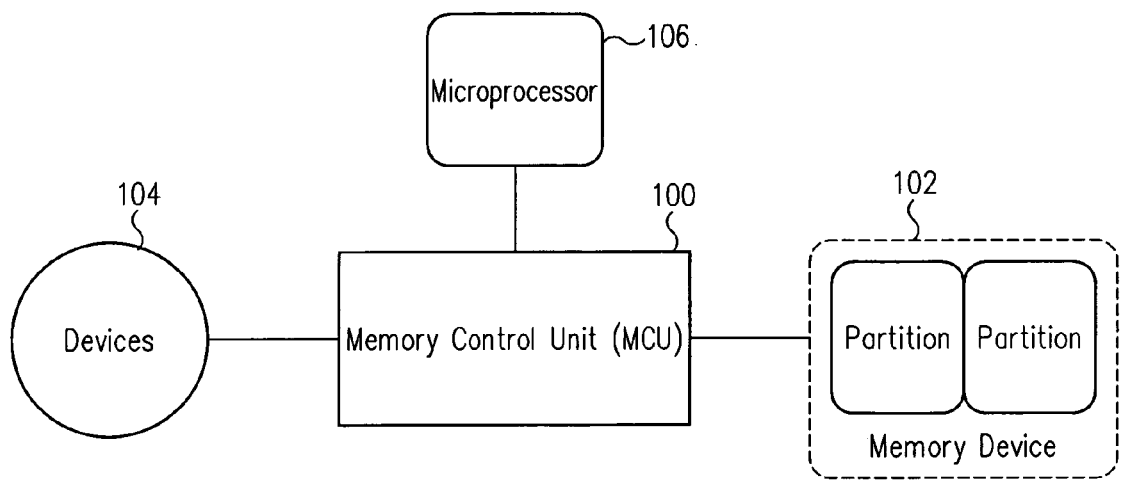
FIG. 1 is a block diagram illustrating a system for providing a redundant backup memory system in accordance with an embodiment of the present invention.

Embodiments of the present invention are described herein in the context of a computer system with redundant memory units. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, and that these specific goals will vary from one implementation to another and from one developer to another.

In accordance with the present invention, the components and process steps may be implemented using various types of operating systems, computing platforms, computer programs, computer hardware, and/or general-purpose machines. In addition, those of ordinary skill in the art will recognize that devices of a less general purpose nature, such as hardwired devices, field programmable gate arrays (FPGA's), application specific integrated circuits (ASICs), or the like, may also be used without departing from the scope and spirit of the inventive concepts disclosed herein. One of ordinary skill in the art will recognize that the present invention could be implemented entirely in software; alternatively, the invention could be implemented in a combination of hardware and software, or could be implemented in hardware alone.

The present invention provides a solution that allows a system using electronic data and memory devices to maintain a redundant set of backup data that allows the system, upon detection of an uncorrectable error, to switch over to the backup data and avoid corruption of the data and shutdown of the system. This allows the system to continue running even if an uncorrectable error is detected, which improves the uptime and reliability of the system. Additionally, the system provides for a mechanism to check the memory device for physical errors, and to put the memory back in service as the new backup memory device if no physical errors are found. This allows the system to continue running with a backup system without having to shut down the system and replace the memory device when there are no physical problems with the memory device. Furthermore, if physical errors are detected, the system may either mark the locations of the physical errors in the memory device as bad, or may signal the system that the memory device has errors and needs to be replaced. This allows the system to continue to run until the memory device may be scheduled to be replaced.

In an embodiment of the present invention, a system with two distinct memory devices may designate at startup one of the memory devices as the primary memory device, and the other memory device as a backup memory device. Those of ordinary skill in the art will recognize that the term memory device as used in this application could encompass the actual memory device as well as any other hardware or software required to access and control the actual memory device. Those of ordinary skill in the art will recognize that the term memory device as used in this application may include semiconductor memory devices, including, but not limited to, dynamic RAM (DRAM), static RAM (SRAM), Rambus dynamic RAM (RDRAM), and other semiconductor memory devices, and may also include magnetic memory devices, including, but not limited to, hard disk drives (HDD), magnetic tape, and other magnetic memory devices, and may also include other known systems for data storage. During operation of the system, the system reads data from and writes data to the primary memory device. At certain intervals, the system may copy the contents of the primary memory device to the backup memory device, thereby maintaining a backup copy of the memory. This may be accomplished via any method that results in a backup copy being created. For example, the system may copy the contents of the entire primary memory device to the secondary memory device; alternatively, it may determine what pages, or parts, in the primary memory have changed since the last copy step, mark those pages or parts as "dirty," and then only copy the "dirty" pages or parts from the primary memory device to the secondary memory device with each copy interval. Those of ordinary skill in the art will now realize that other methods may be used to generate the backup copy. The copy intervals may be constant, may be variable, or may be functions of the use and operation of the system. For example, the copy interval may be set at once per minute; alternatively, the copy interval could vary between two to five minutes, with the actual value being randomly determined. As a further example, the copy interval could be based on system usage, and be set to copy after every 100 read events, or whenever an access is made to that page of memory. The system may also receive notification and log whenever a copy event occurs. Those of ordinary skill in the art will now realize that other methods may be used determine the copy interval.

During the reading and writing of data from the primary memory device, Error Correcting Circuits (ECC's) are typically scanning the data constantly to check for and correct errors. In an embodiment of the present invention, if an uncorrectable error is detected, the system may designate the backup memory device as the primary memory device, and take the other memory device off-line. Since the backup memory device has a copy of all of the current data, the system may continue operating without downtime. Because a switching event may not occur immediately after a backup copy event, the system may use the log of the previous copy events to determine whether to resend data or send another request for data.

In an embodiment of the present invention, the system may send a notification that there is a memory device offline, and that the system is now operating without a redundant backup memory device. The system may then either continue to run without backup, or may initiate a controlled shutdown for service. Alternatively, the system may test the off-line memory device to determine if the error is a "hard" error, that is, a recurring physical error in the device, or a "soft" error, that is, the data itself was corrupted in some fashion. If the error is found to be a "soft" error, the system may put the memory device back in service as the backup memory device or as the primary memory device. If the error is found to be a "hard" error, the system may then either continue to run without backup, or may initiate a controlled shutdown for service. Alternatively, the system could "mark" the pages or parts of the memory device where the physical errors are located as bad, and put the memory device back in service as the backup memory device. The system would be notified of the physical error, and no data would be written to or retrieved from the "bad" pages or parts of the memory device.

In another embodiment of the present invention, instead of having a system with two physical memory devices, in a system with a single physical memory device, the system could treat the single device as if it had two "partitions," or two "logical" devices, and designate one partition or one logical device as primary and the other partition or logical device as backup. In all other respects, this system would work in the same fashion as a system with two physically distinct memory devices. Therefore, for purposes of this application, the term memory device should not be construed as being limited to a distinct physical device.

In another embodiment of the present invention, instead of having a system with two physically distinct memory devices, a system could have any number of memory devices, in any combination of physical and logical memory devices, so long as the physical and logical memory devices designated a backup have at least the same memory capacity as the physical and logical memory devices designated as primary. In all other respects, this system would work in the same fashion as the system with two physically distinct memory devices.

In another embodiment of the present invention, in a computer system having a Non-Uniform Memory Access (NUMA) architecture, each microprocessor in a multi-processor system has a memory device associated with it that may be utilized. Each microprocessor can communicate directly with its associated memory device. In a NUMA system, any microprocessor may access either its own memory device or the memory device associated with any other microprocessor in the system; however, when a microprocessor attempts to access memory from a memory device associated with another processor, the wait time, or latency time, for that data to arrive at the requesting processor may be long when compared to fetching data directly from the processor's associated memory device. This can present a problem when interacting with two different memory devices, as the system may not know how long to wait for a response. By using an embodiment of the present invention to designate a primary memory device and a backup memory device, the system can consistently interact with one memory device or the other, and thus the latency time is more predictable. If an uncorrectable error is detected and the backup memory device is switched to become the primary memory device, the latency time remains consistent, although it may be different than before.

FIG. 1 is a block diagram illustrating a system for providing a redundant backup memory system in accordance with an embodiment of the present invention. Memory Control Unit (MCU) 100 is associated with memory device 102. Devices 104 and microprocessor 106 communicate with memory device 102 through MCU 100. Memory device 102 may be partitioned into two logical memory devices, such as partition #1 108 and partition #2 110, both coupled to MCU 100. One of the logical memory devices may be designated primary memory device and the other logical memory device may be designated backup memory device. During operation, devices 104 and microprocessor 106 communicate with the MCU 100, and at specified intervals, the contents of the primary memory device may be copied to the backup memory device. If the MCU's ECC detects an uncorrectable error, the designation of the backup memory device is switched to primary, and the memory device that was primary is now designated backup. The new backup memory device may be tested for physical errors. If a physical error is detected, the new backup memory device may alternatively be taken offline, or the bad pages or parts may be marked, and the memory device may continue to operate as the backup devices.

Figure 2:
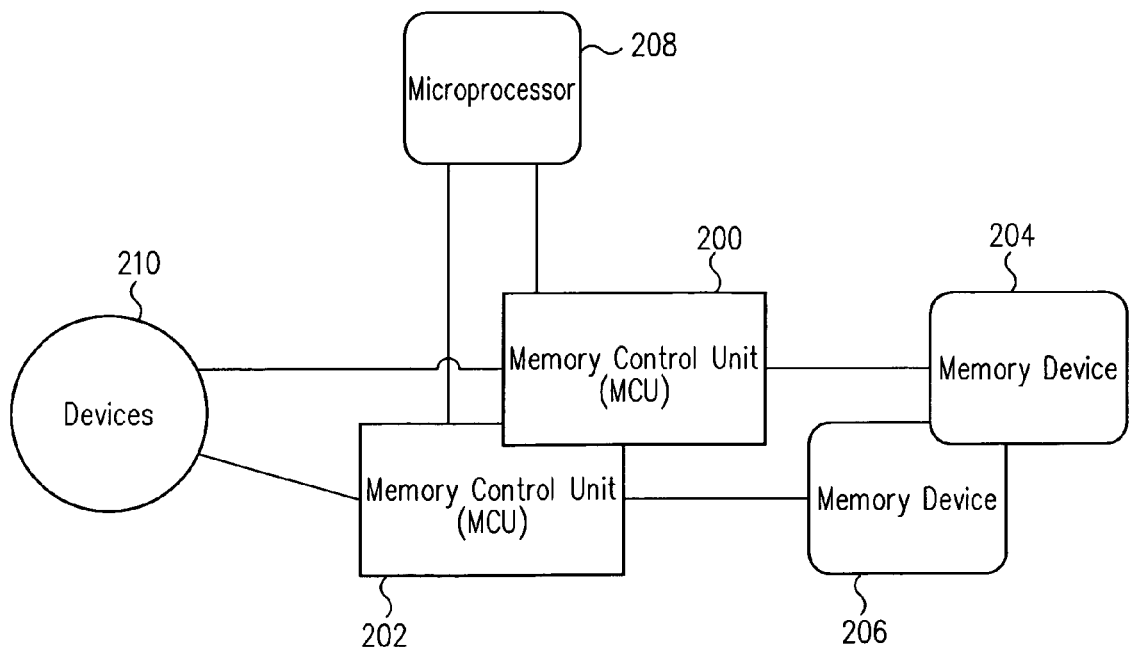
FIG. 2 is a block diagram illustrating a system for providing a redundant backup memory system in accordance with another embodiment of the present invention.

FIG. 2 is a block diagram illustrating a system for providing a redundant backup memory system in accordance with another embodiment of the present invention. MCU's 200 and 202 may be associated with memory devices 204 and 206, respectively. One of the MCU's and its associated memory device may be designated primary, and the other may be designated backup. Microprocessor 208 and devices 210 may communicate with the memory devices 204 and 206 through the MCU's 200 and 202, respectively. During operation, microprocessor 208 and devices 210 may communicate with the primary MCU, and at specified intervals, the contents of the primary memory device may be copied to the backup memory device. If the primary MCU's ECC detects an uncorrectable error, the designation of the backup MCU and memory device may be switched to primary, and the MCU and memory device that were primary may now be designated backup. The new backup MCU and memory device may be tested for physical errors. If a physical error is detected, the new backup MCU and memory device may alternatively be taken offline, or the bad pages or parts may be marked, and the MCU and memory device may continue to operate as the backup devices.

Figure 3:
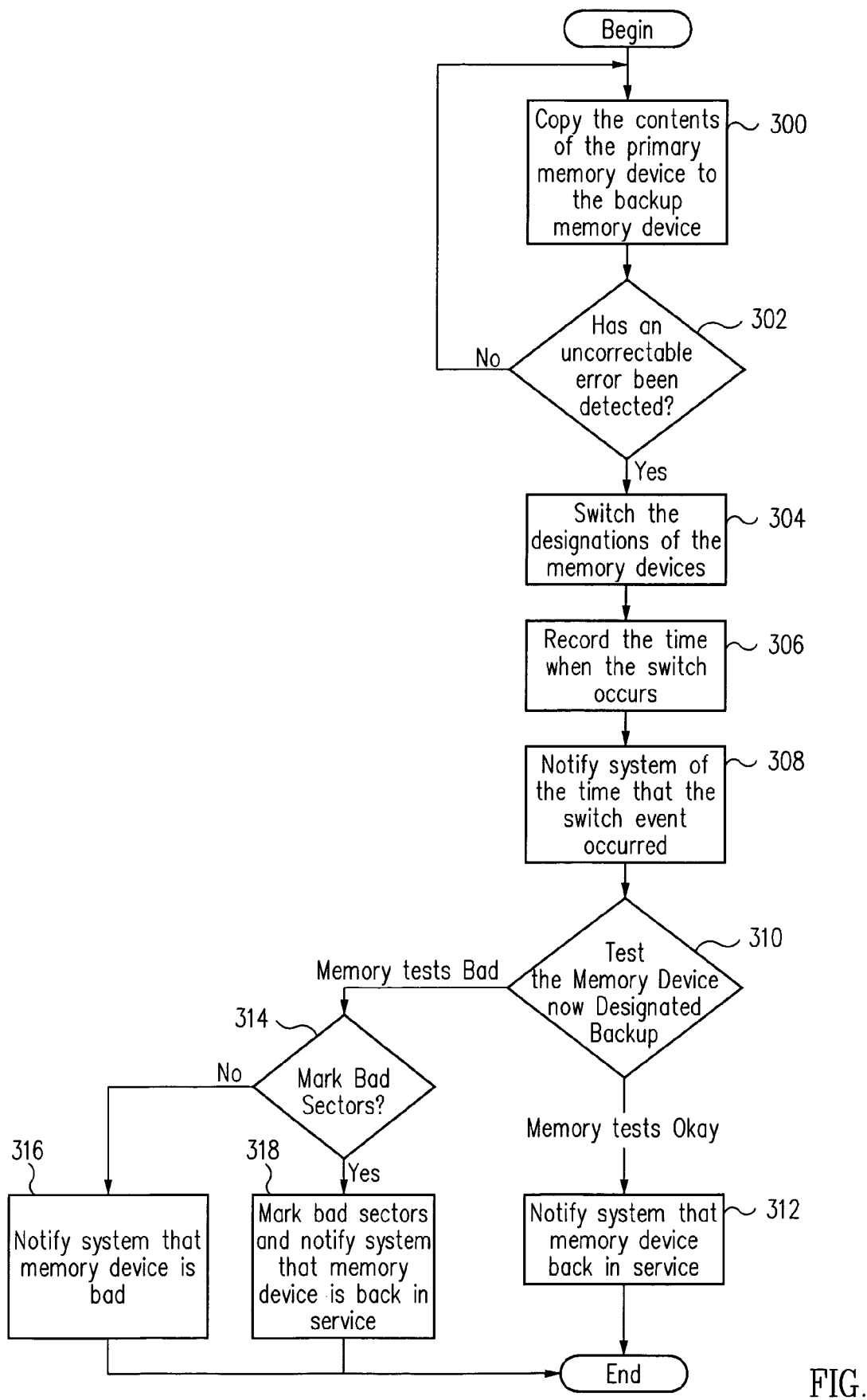
FIG. 3 is a flow diagram illustrating a method for providing a redundant backup memory system in accordance with an embodiment of the present invention.

FIG. 3 is a flow diagram illustrating a method for providing a redundant backup memory system in accordance with an embodiment of the present invention. At 302, an interval may be specified by an operator or by a control system. At 304, a check may be made to see if the interval has expired. At 306, if the interval has expired, the contents of a primary memory device may be copied to a backup memory device. At 308, data may be written to memory, and the data may be checked for errors at 310. At 312, if an uncorrectable error is detected, designations of the primary and backup memory devices may be switched at 314. At 316, the memory device now designated backup may be tested; if the memory device now designated backup is found to be bad, pages or parts of the memory device may be marked as bad at 318 and a notification that the memory device now designated backup is bad may be sent at 320.

Figure 4:
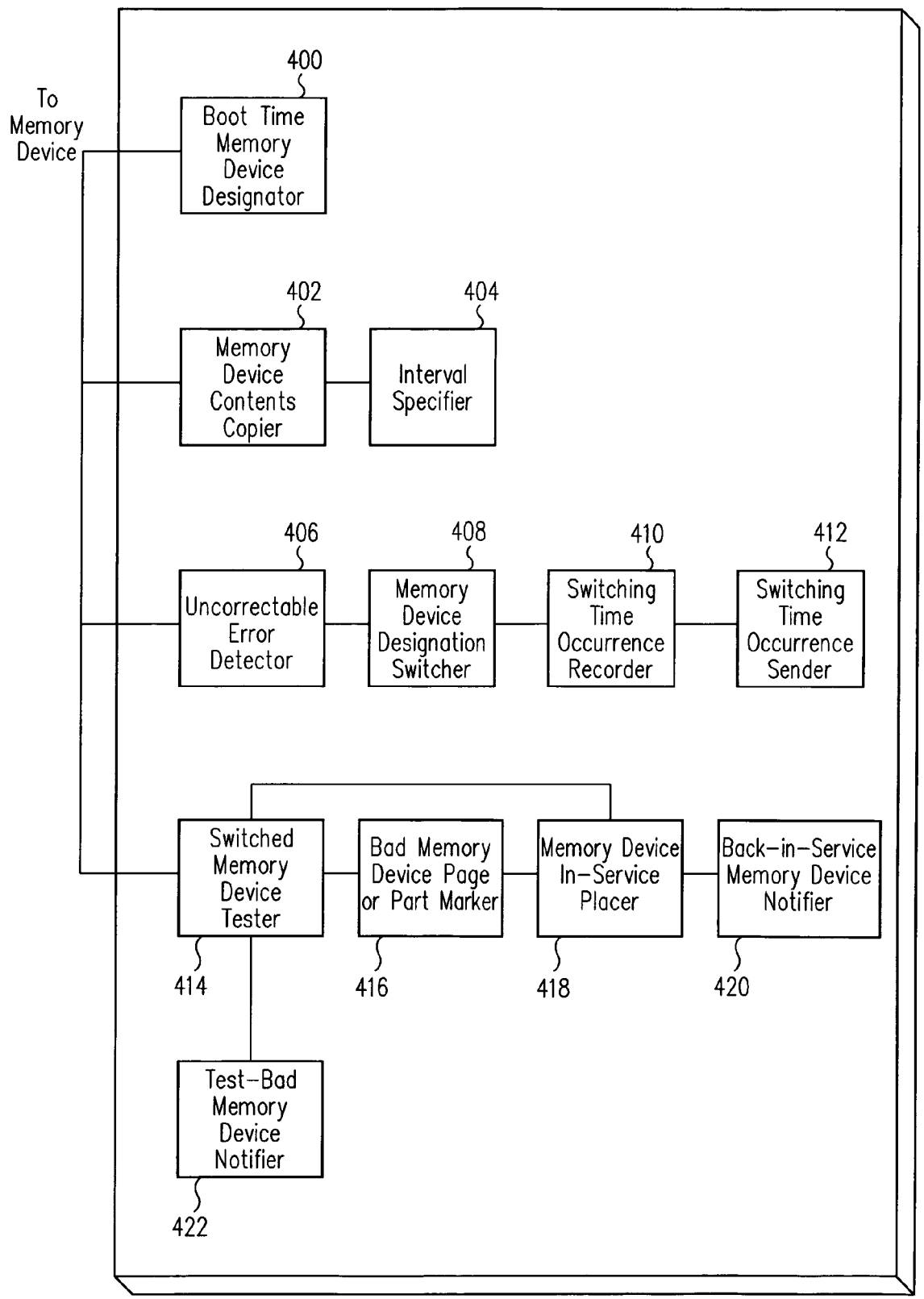
FIG. 4 is a block diagram illustrating an apparatus for maintaining a backup of the memory in a backup memory device and switching to that backup memory upon detection of an uncorrectable error in accordance with an embodiment of the present invention.

FIG. 4 is a block diagram illustrating an apparatus for providing a redundant backup memory system in accordance with an embodiment of the present invention. The apparatus may be located in a system having one or more memory devices. When the system is started, a Boot Time Memory Device Designator 400 may designate a memory device as primary and a memory device as backup. A Memory Device Contents Copier 402 may copy the contents of the memory device designated primary to the memory device designated backup. The copy events may take place at intervals specified by an Interval Specifier 404 coupled to the Memory Device Contents Copier 402. If an Uncorrectable Error Detector 406 detects an uncorrectable error, a Memory Device Designation Switcher 408 coupled to the Uncorrectable Error Detector 406 may switch the designations of the memory device designated primary and the memory device designated backup. A Switching Time Occurrence Recorder 410 coupled to the Memory Device Designation Switcher 408 may then record the time the switch occurs, and a Switching Time Occurrence Sender 412 coupled to the Switching Time Occurrence Recorder 410 may notify the control system that the switch event occurred. A Switched Memory Device Tester 414 may test the memory device designated backup after the switch; if the memory device is found to be bad, a Bad Memory Device Page or Part Marker 416 coupled to the Switched Memory Device Tester 414 may mark the bad pages or parts of the memory device. If the Bad Memory Device Page or Part Marker 420 marks bad sectors, a Memory Device In-Service Placer 418 coupled to the Bad Memory Device Page or Part Marker 416 and the Switched Memory Device Tester 414 may place the marked memory device back in service, and a Back-In-Service Memory Device Notifier 420 coupled to the Memory Device In-Service Placer 418 may notify the control system that the memory device is back in service. If the Bad Memory Device Page or Part Marker 416 does not mark bad sectors, a Tested-Bad Memory Device Notifier 422 coupled to the Switched Memory Device Tester 414 may notify the control system that said memory device is bad. If the memory device is not found to be bad, the Memory Device In-Service Placer 418 coupled to the Switched Memory Device Tester 414 may place the memory device back in service, and the Back-In-Service Memory Device Notifier 420 coupled to the Memory Device In-Service Placer 418 may notify the control system that the memory device is back in service.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for providing redundancy and recovery for a first memory device designated primary by utilizing a second memory device designated backup, the method comprising:
   copying contents of the primary memory device to the backup memory device at specified intervals;
   detecting an uncorrectable error in data received from or sent to the first memory device designated primary;
   switching the designation of the first memory device from primary to backup and the designation of the second memory device from backup to primary in response to said detecting;
   testing the memory device now designated backup after said switching;
   marking pages or parts of the memory device now designated backup as bad if said testing so indicates; and
   notifying a control system that the memory device now designated backup is bad if said testing so indicates.

2. An apparatus for providing memory redundancy and recovery in a system including a first memory device designated primary and a second memory device designated backup, the apparatus comprising:
   a memory device contents copier coupled to said first memory device designated primary and to said second memory device designated backup;
   an interval specifier coupled to said memory device contents copier;
   an uncorrectable error detector coupled to said first memory device designated primary and said second memory device designated backup;
   a memory device designation switcher coupled to said uncorrectable error detector;
   a switched memory device tester coupled to said first memory device designated primary and to said second memory device designated backup;
   a tested-bad memory device page or part marker coupled to said switched memory device tester;
   a memory device in-service placer coupled to said tested-bad memory device page or part marker; and
   a tested-bad memory device notifier coupled to said switched memory device tester.

3. The apparatus of claim 2, further including a boot-time memory device designator coupled to said first memory device designated primary and to said second memory device designated backup.

4. An apparatus for providing redundancy and recovery for a first memory device designated primary by utilizing a second memory device designated backup, the apparatus comprising:
   means for copying contents of the primary memory device to the backup memory device at specified intervals;
   means for detecting an uncorrectable error in data received from or sent to the first memory device designated primary;
   means for switching the designation of the first memory device from primary to backup and the designation of the second memory device from backup to primary in response to said detecting;
   means for testing the memory device now designated backup after said switching;
   means for marking pages or parts of the memory device now designated backup as bad if said testing so indicates; and
   means for notifying a control system that the memory device now designated backup is bad if said testing so indicates.

5. A system for providing memory redundancy and recovery, the system comprising:
   a first memory device designated primary;
   & second memory device designated backup;
   one or more processors coupled to said first memory device designated primary and to said second memory device designated backup;
   an operating system including:
      a memory device contents copier coupled to said first memory device designated primary and to said second memory device designated backup;
      an interval specifier coupled to said memory device contents copier;
      an uncorrectable error detector coupled to said first memory device designated primary and said second memory device designated backup;
      a memory device designation switcher coupled to said uncorrectable error detector;
      a switched memory device tester coupled to said first memory device designated primary and to said second memory device designated backup;
      a tested-bad memory device page or part marker coupled to said switched memory device tester;
      a memory device in-service placer coupled to said tested-bad memory device page or part marker; and
      a tested-bad memory device notifier coupled to said switched memory device tester.

6. The system of claim 5, wherein said operating system further comprises:
   a boot-time memory device designator coupled to said first memory device designated primary and to said second memory device designated backup.

7. A program storage device readable by a machine, tangibly embodying a program of instructions executable by the machine to perform a method for providing redundancy and recovery for a first memory device designated primary by utilizing a second memory device designated backup, the method including:
   copying contents of the primary memory device to the backup memory device at specified intervals;
   detecting an uncorrectable error in data received from or sent to the first memory device designated primary;
   switching the designation of the first memory device from primary to backup and the designation of the second memory device from backup to primary in response to said detecting;
   testing the memory device now designated backup after said switching;
   marking pages or parts of the memory device now designated backup as bad if said testing so indicates; and
   notifying a control system that the memory device now designated backup is bad if said testing so indicates.

* * * * *